United States Patent [19]

Peterson et al.

[11] Patent Number: 5,008,882
[45] Date of Patent: Apr. 16, 1991

[54] METHOD AND APPARATUS FOR ELIMINATING UNSUCCESSFUL TRIES IN A SEARCH TREE

[75] Inventors: John C. Peterson, Alta Loma; Edward Chow, San Dimas; Herb S. Madan, Marina del Rey, all of Calif.

[73] Assignee: California Institute of Technology, Pasadena, Calif.

[21] Appl. No.: 86,722

[22] Filed: Aug. 17, 1987

[51] Int. Cl.$^5$ .............................................. H04J 3/24
[52] U.S. Cl. .................................. 370/94.3; 370/94.1
[58] Field of Search .................. 370/60, 94, 85, 86, 370/88, 89, 54, 95, 60.1, 94.1, 85.1, 85.12, 85.13, 85.7, 85.15, 95.1, 94.3

[56] References Cited

U.S. PATENT DOCUMENTS

| | | | |
|---|---|---|---|
| 4,247,892 | 1/1981 | Lawrence | 364/20 |
| 4,345,326 | 8/1982 | Dieudonne et al. | 370/60 |
| 4,736,363 | 4/1988 | Aubin et al. | 370/60 |
| 4,739,476 | 4/1988 | Fiduccia | 364/200 |
| 4,797,882 | 1/1989 | Maxemchuk | 370/88 |
| 4,805,166 | 2/1989 | Ardon et al. | 370/54 |
| 4,811,214 | 3/1989 | Nosenchuck et al. | 364/200 |
| 4,814,980 | 3/1989 | Peterson et al. | 364/200 |

Primary Examiner—Douglas W. Olms
Assistant Examiner—Wellington Chin

[57] ABSTRACT

A circuit switching system in an M-ary, n-cube connected network completes a best-first path from an originating node to a destination node by latching valid legs of the path as the path is being sought out. Each network node is provided with a routing hyperswitch sub-network, ("HSN") connected between that node and bidirectional high capacity communication channels of the n-cube network. The sub-networks are all controlled by routing algorithms which respond to message identification headings ("headers") on messages to be routed along one or more routing legs. The header includes information embedded therein which is interpreted by each sub-network to route and historically update the header. A logic circuit, available at every node, implements the algorithm and automatically forwards or back-tracks the header in the network legs of various paths until a completed path is latched.

51 Claims, 7 Drawing Sheets

| M = 2 NUMBER OF NODES | STEPS REQUIRED TO LOCATE PATH TO DESTINATION (FIRST FIT) (ALGORITHM K') | | | | | | | | | | | | | TERMINATE WITHOUT SOLUTION |
|---|---|---|---|---|---|---|---|---|---|---|---|---|---|---|
| | TERMINAL CHANNELS BUSY | | | | | | | | | | | | | |
| | 0 | | 1 | | 2 | | 3 | | 4 | | 5 | | 6 | |
| | LB | UB | LB | UB | LB | UB | LB | UB | LB | UB | LB | UB | LB | UB | |
| ① N=16, n=4 | | 3 | 4 1 | 7 4 | 6 3 | 9 6 | 9 6 | 12 9 | | | | | | | FH 18 BH 14 |
| ② N=32, n=5 | | 4 | 5 1 | 9 5 | 7 3 | 11 7 | 11 6 | 15 10 | 19 12 | 23 16 | | | | | FH 35 BH 29 |
| ③ N=64, n=6 | | 5 | 6 1 | 11 6 | 8 3 | 13 8 | 12 6 | 17 11 | 20 12 | 25 17 | 29 18 | 34 23 | | | FH 67 BH 59 |

LB — LOWER BOUND, DESIGNATES MIN. No. OF HOPS WITH CONGESTION CONCENTRATED IN TERMINAL CHANNELS

UB — UPPER BOUND, DESIGNATES MAX. No. OF HOPS WITH CONGESTION PRESENT UNIFORMLY ACROSS NETWORK TERMINAL CHANNELS

FH FORWARD HOPS

BH BACKWARD HOPS

FIG. 7

METHOD AND APPARATUS FOR ELIMINATING UNSUCCESSFUL TRIES IN A SEARCH TREE

1. ORIGIN OF THE INVENTION

The invention described herein was made in the performance or work under a NASA contract, and is subject to the provisions of Public Law 96-517 (35 USC 202) in which the Contractor has elected to retain title.

BACKGROUND OF THE INVENTION

2. Field of the Invention

The field of this invention relates to data transfer through data-driven switching networks among concurrent computers ("nodes"). More particularly, the field relates to improved routing algorithms for switching networks which link M-ary n-cube nodes together by communication channels between nodes, which channels terminate in the switching networks.

3. Brief Description of the Prior Art

Concurrent computing systems connected in a cube configuration are disclosed and claimed in applications assigned to the assignee of this application. For example, a concurrent computing system in which individual computers, each with a computational processor and a message-handling processor, are connected as a hypercube is described and claimed in an application entitled "Concurrent Computing Through Asynchronous Communication Channels," filed on July 12, 1985, and assigned to California Institute of Technology. The identified application is referred to herein as the Seitz et al, Cosmic Cube application. The nodes are computers comprised of processors and memory, and the nodes communicate with each other by bidirectional communication links only along the edges of the cube.

In an application assigned to the assignee hereof, entitled "Method and Apparatus for Implementing a Maximum-Likelihood Decoder in a Hypercube Network" filed on Sept. 27, 1985, having Ser. No. 781,224 by Fabrizio Pollara-Bozzola, convolutional codes are decoded by the accumulated metric and survivor steps of the Viterbi algorithm. The improved system divides the decoding operation in parallel among all processors which are assigned unique states of the trellis to compute at different stages on the trellis. In this and Seitz et al Cosmic Cube application, X, Y, and Z indicate directions of communication in the cube. Each node is assigned a different binary coded identification label, which labels are uniquely ordered in the network. A destination descriptor accompanies each block of data and that destination descriptor is modulo-two added to the local label of a receiving node in order to control message routing.

Message routing is employed in another application assigned to the assignee hereof, entitled "Concurrent Hypercube Computing System with Improved Message Passing" filed on Apr. 1, 1986, naming J. C. Peterson et al as inventors. In the latter application, separate control channels in addition to bidirectional communication channels link each adjacent node together.

As each of the above-identified applications suggest, the communication time and the amount of communication and control channel wiring are significant factors in the application of concurrent computing nodes to cube-connected systems. Deadlock-free routing is achieved in all of these applications by routing along successive dimensions.

In an application entitled "Torus Routing Chip" invented by Chares L. Seitz and William J. Dally, filed on Dec. 18, 1986, and assigned to the same assignee as this application, another deadlock free routing system invention is disclosed. Instead of reading an entire data packet into an intermediate processing node before starting transmission to the next node, the routing of this latter invention forwards each flow control unit (flit) of the packet to the next node as soon as it arrives. This so-called "wormhole" routing results in a reduced message latency when compared under the same conditions to store-and-forward routing. Another advantage of wormhole routing is that the communication does not use up the memory bandwidth of intermediate nodes, and a packet does not interact with the processor or memory of intermediate nodes along its route. Packets are moved by self-timed routing elements and remain strictly within the routing network until they reach their destination. If a routing network at a node is blocked, the packet pauses in the network and does not advance until that node's network is not busy and the packet can advance further.

In the invention of this application, a message header is sent initially to form a completed path through any number of nodes between an originating and a destination node. The completed path is a virtual circuit for pipelining of data between the originating and destination nodes.

SUMMARY OF THE INVENTION

A circuit switching system in an M-ary, n-cube connected network completes a path from an originating node to a destination node by latching valid portions of the path as the path is being sought out. Each node in the network is provided with a routing, or hyperswitch sub-network, ("HSN") connected between that node and bidirectional high capacity communication channels of the n-cube network. The sub-networks are all controlled by routing algorithms which respond to message identification headings ("headers") on messages to be routed from an originating node along one or more routing legs to some destination node in the n-cube network. The header includes information embedded therein which is interpreted by each sub-network to route and historically update the header so that one of a great number of possible paths is selected and latched in a highly efficient manner. A logic circuit, available at every node, automatically forwards or back-tracks the header until a completed path is latched. The header is never buffered at an intermediate node. Instead, the header is either forwarded to the next available node or it is backtracked to the last forwarding node. Backtracking is done in an expedient manner by using backtrack status signals.

Routing logic at every HSN implements the switching system's common adaptive routing algorithm and assures that a completed path exists from the originating node through the various routing legs to the destination node before data enters the high capacity communication channels. If any one leg of a message's contemplated path is not available ("BUSY"), other possible legs at that busy node are computed through a best first search. If all possibilities are busy, the message does not advance, and the routing logic informs the last successful node about the congestion. The header at the last successful node's network is updated with the dynamic congestion history and the status of other untried, or virgin paths, are thereafter automatically checked by the adaptive routing algorithm. Paths already attempted in an unsuccessful manner are pruned, i.e., are not retried again during the continuation of that one routing cycle.

BRIEF DESCRIPTION OF THE DRAWINGS

FIG. 7 is a chart useful in explaining the routing algorithms of the invention.

DETAILED DESCRIPTION OF THE DRAWING

Figure 1:
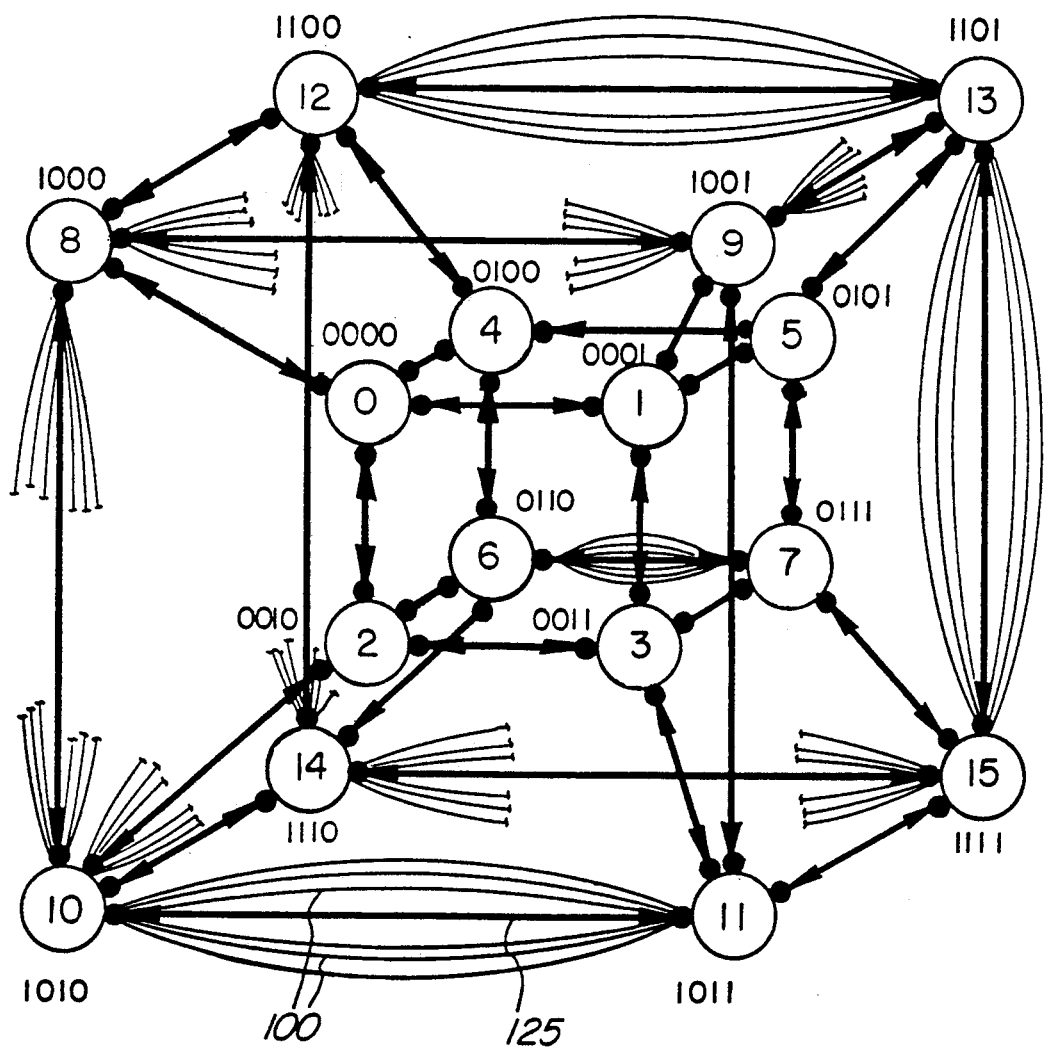
FIG. 1 a sixteen node hypercube network (M=2, n=4)

FIG. 1 depicts sixteen identical computers ("nodes") with each computer shown simply as a circle. The (N=16) computers are connected in an array of $N=M^n$ (for M=2) processors, with each processor connected directly to its n neighbors in n dimensions of a cube. The presentation of FIG. 1 depicts a four-dimensional space diagram. Solutions to computer problems are solved by the various nodes of FIG. 1 operating concurrently. Before describing the circuit switching features of this invention in detail, it is believed that some general background is in order.

Performance of tasks among various nodes (such as the sixteen nodes depicted in FIG. 1) is available through either a minimal or a high degree of interaction between tasks. Systems which have this wide latitude of interaction, are generally designated as loosely coupled systems. The performance of such systems depends largely on the efficiency of communication between the processing nodes. Hypercube-connected computer systems are scheduled to contain as many as a million nodes, or higher, in future systems. These high-numbered nodes present aggregate transmission requirements in the gigabit per second range.

In the aforementioned Peterson et al application, each node includes a dedicated input/output (I/O) control subprocessor which is reserved exclusively for handling messages between processisng nodes. In Peterson et al, a full duplex bidirectional communication link is used for message passing between nodes along the edges of the n-dimensional cube. Status and control lines are also connected between each of the neighboring nodes. Each bidirectional link terminates in a transceiver at each node, which transceiver is controlled by the I/O subprocessor. FIFOs may be used at each transceiver location to transmit/receive data. Status and control lines, between neighboring nodes, determine the status of a neighbor's FIFO and the presence of a communication link between two adjacent nodes so that a message can be passed between the two neighboring nodes The I/O subprocessor controls message routing between neighboring nodes by gaining priority over a communication link and in accordance with the status of FIFO's at those neighboring nodes.

Even with a dedicated I/O subprocessor, because of the software overhead, the effective bandwidth for transmission between neighboring nodes is only 20 megabits/second (Mbit/s) compared to the 100 Mbit/s available in hardware bandwidth. When a message needs to be rerouted through an intermediate node, due to the interrupt latency, 40 microseconds per hop is incurred. Because there is only one I/O control processor and a single shared bus for all the I/O channels, only one channel per node can be served at a time. Thus, the maximum utilization of channels in an N-node hypercube is only N, which is significantly less than the maximum hardware limitation of $N*\log_M N$. Also, a fixed e-cube routing algorithm is used in the hypercube computer to avoid deadlock This fixed e-cube algorithm, as reported by C. Lang, "The Extension of Object-Oriented Languages to a Homogeneous Concurrent Architecture," Department of Computer Science, California Institute of Technology, Technology Report, 5014:TR:82, 1982 pp. 118–124, creates hot-spots for lower order channels and it is not fault tolerant.

In summary, the previously known hypercube communication limitations are:

(a) High message communication latency.
(b) Low channel utilization.
(c) Static routing algorithm.
(d) Not fault tolerant.
(e) Parallel links have too many wires.

The hyperswitch sub-network (HSN) of this application is a high-speed serial data driven switching network with dynamic routing algorithms which are well suited for hypercube computer systems. The approach for this invention is based on the Distributed Dynamic Network (DDN) model reported by E. Chow and S. Y. Kung, "Distributed Dynamic Network for VLSI Parallel Computers," University of Southern California Technique Report, 1986. This type of network has the advantages of both static and dynamic networks. The static network characteristics enable the hyperswitch sub-network to keep locality, increase the number of I/O links and provide multiple paths between two communicating nodes. The dynamic network characteristics provide high permutability, short message latency and capability to explore other computational problem mapping models. The combined characteristics of the static and dynamic networks enable the HSN to be highly fault tolerant and to utilize the full hardware communication bandwidth.

A dynamic routing algorithm with congestion learning and avoidance capability has been developed for the HSN. Because multiple paths exist between hypercube nodes, this dynamic routing algorithm enables messages to select the best-first available path which does not repeat previously experienced congested paths. Thus, possible collision can be avoided and the shortest path setup time can be achieved.

In this application a completed path from an originating node through any number of intermediate nodes to a destination node is latched by the use of status and control lines before any data transmission commences. Each node, in accordance with this invention, includes a custom circuit as an intelligent switching element which uses a routing control unit with an automatic routing and logic algorithm to optimally locate a completed path through the cube-connected network. For simplicity sake such a cube-connected network is called a hypercube, and the automatic routing and logic is termed a hyperswitch sub-network ("HSN"). Every node includes an identical hyperswitch sub-network, or HSN.

In accordance with the invention, a search tree in a hypercube network is pruned by eliminating paths already attempted unsuccessfully and then the untried, or virgin, territories are systematically explored to select one of many possible paths. Once a complete path has been traced and reserved, the path sections are latched to form a complete path for message transmission from the originating node to the destination node. The completed path can span many nodes, and since it is latched by the hyperswitch sub-network before any data is transmitted; transmitted data need not enter any intermediate node for interaction with that node's processor or memory during its transmission. Data may be pipelined up to the hardware limits for the communication paths.

In FIG. 1, assume that a message has originated at the upper-left node of the inner cube (node number 0 as shown within the node's circle) and that the message is destined for the rear rightmost lower node in the outer cube (node number 15). A visual inspection readily reveals that there are numerous paths available between any such two or more remotely located nodes. For example, simply to reach the outer cube from the inner cube may involve anywhere from a minimum of one to many, many hops or possibilities depending upon whether nodes are revisited more than once.

The vast number of possibilities can be reduced provided some rules of travel are defined. Even with travel rules, however, the number of possibilities remains very large. For example, if thirty-two nodes are connected in a five-dimensional cube and travel is always routed from the lowest-order node to the next highest-order node one hop at a time, there are one hundred twenty possibilities between node 0 to node 31. For the sixteen-node example in FIG. 1, there are twenty-four possible paths between node 0 and node 15. Table 1 shows these twenty-four possible paths. Comparable tables may be readily prepared for the possible paths between any two given nodes.

TABLE 1

| 1.  | 0 to | 1 to | 3 to  | 7 to  | 15 |
|-----|------|------|-------|-------|----|
| 2.  | 0 to | 1 to | 3 to  | 11 to | 15 |
| 3.  | 0 to | 1 to | 5 to  | 7 to  | 15 |
| 4.  | 0 to | 1 to | 5 to  | 13 to | 15 |
| 5.  | 0 to | 1 to | 9 to  | 11 to | 15 |
| 6.  | 0 to | 1 to | 9 to  | 13 to | 15 |
| 7.  | 0 to | 2 to | 3 to  | 7 to  | 15 |
| 8.  | 0 to | 2 to | 3 to  | 11 to | 15 |
| 9.  | 0 to | 2 to | 6 to  | 7 to  | 15 |
| 10. | 0 to | 2 to | 6 to  | 14 to | 15 |
| 11. | 0 to | 2 to | 10 to | 11 to | 15 |
| 12. | 0 to | 2 to | 10 to | 14 to | 15 |
| 13. | 0 to | 4 to | 5 to  | 7 to  | 15 |
| 14. | 0 to | 4 to | 5 to  | 13 to | 15 |
| 15. | 0 to | 4 to | 6 to  | 7 to  | 15 |
| 16. | 0 to | 4 to | 6 to  | 14 to | 15 |
| 17. | 0 to | 4 to | 12 to | 13 to | 15 |
| 18. | 0 to | 4 to | 12 to | 14 to | 15 |
| 19. | 0 to | 8 to | 9 to  | 11 to | 15 |
| 20. | 0 to | 8 to | 9 to  | 13 to | 15 |
| 21. | 0 to | 8 to | 10 to | 11 to | 15 |
| 22. | 0 to | 8 to | 10 to | 14 to | 15 |
| 23. | 0 to | 8 to | 12 to | 13 to | 15 |
| 24. | 0 to | 8 to | 12 to | 14 to | 15 |

Figure 2:
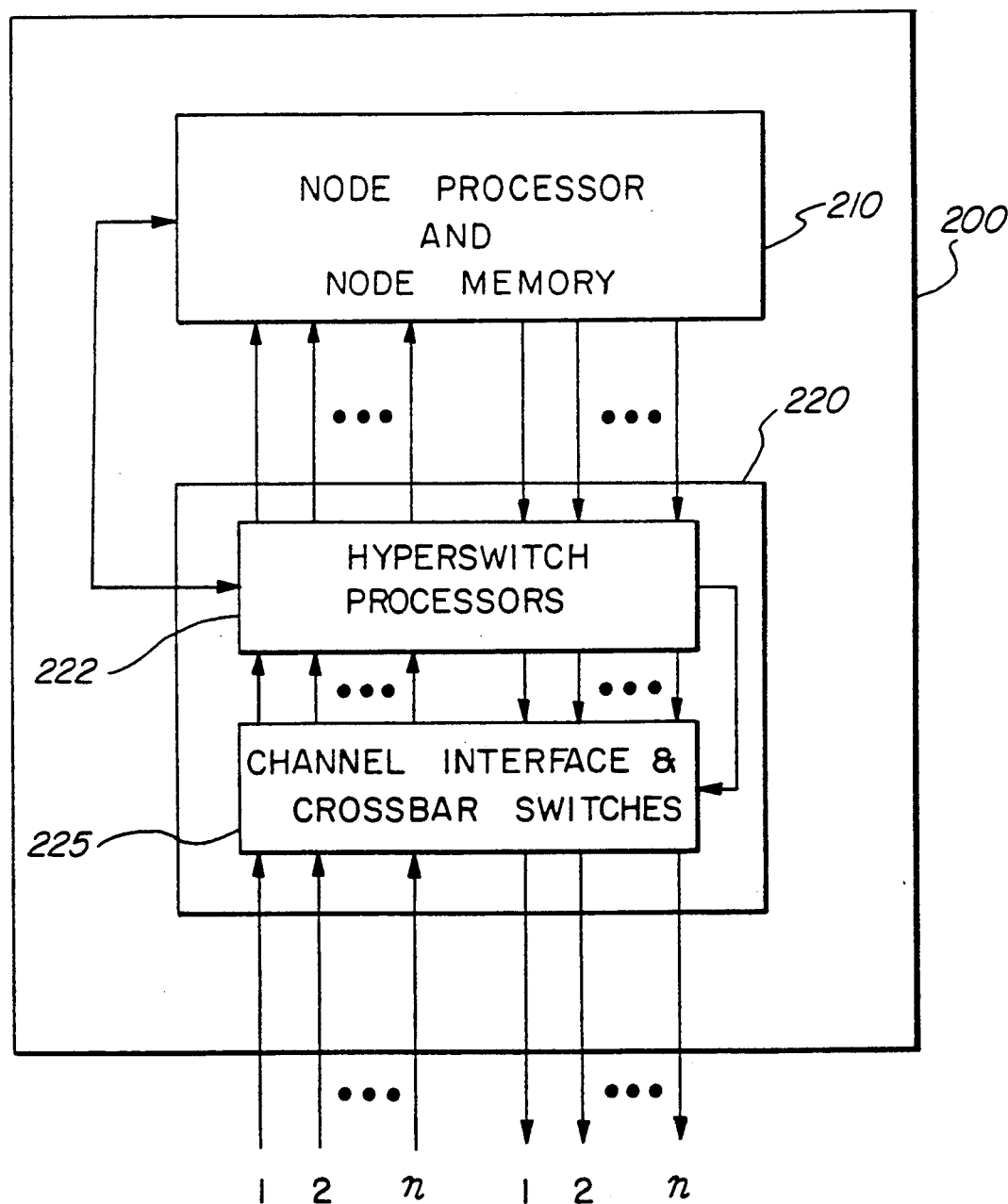
FIG. 2 is a simplified block diagram showing a node and its associated hyperswitch subnetwork which includes hyperswitch processors and crossbar switches in accordance with the invention.

FIG. 2 depicts a block diagram of any one of the identical hypercube nodes 200. Each node includes a node processor 210 and its associated node memory. Each node has associated therewith a hyperswitch sub-network 220, each of which includes a plurality of sub processors 222 and a channel interface and crossbar switches unit 225. Each dimension of the cube provides a separate communication path into and out of each node. Those paths are shown simply as paths 1, 2, through n where n is the dimension of the cube.

Each HSN, such as HSN 220, has two separate operating modes. These two modes are called a "path setup" mode and a "data transmission" mode. For purposes of describing this invention, we shall focus primarily on the path setup mode, or routing mode for each hyperswitch.

The protocol for the HSN is as follows:
(a) The source node HSN sends a header word with the destination node's address embedded therein to its selected next-neighbor HSN and reserves the path through which the header travels.
(b) The intermediate HSN evaluates the header, reroutes this header to its selected next-neighbor HSN which is not busy, and then switches the local crossbar switch to connect the header inbound channel to the outbound channel. If all the selected HSNs are busy, then this intermediate HSN will send backtrack status (by status lines, such as line 100, FIG. 1) to the previous HSN.
(c) Step (b) is repeated until the header reaches its destination node.
(d) The destination HS sends an acknowledgment back (by status lines) to the source HSN through the intermediate node's HSNs. Network connection (pipeline through communication path 125, FIG. 1) is set and information (data messages) can start to be transmitted.

The status signal in the hyperswitch sub-network is two bits of encoded information passed back through the special status links 100. These two bits are interpreted differently in the path setup mode and the data transmission mode. In the path setup mode, the status bits are:
00—Ready to receive header
01—Ready to receive data
10—Header backtracked to the previous node
11—Header error, retransmit header Initially, the hyperswitches are in path setup mode. After the header is received by a destination HSN, the status is changed to 01. Then the HSN enters data transmission mode. In the data transmission mode, the status bits are:
00—Break pipeline to source
01—Ready to receive data
10—Wait for next data packet
11—Data error, retransmit data packet This protocol fully utilizes the intelligent distributed crossbar capability of the HSN. No intermediate node's processor will be interrupted if it is not necessary.

During the path setup process, for the above-described protocol no information can be transferred. Thus channels, as far as data transmission is concerned, are idle during this path setup phase. For a regular problem with known communication patterns, the routing pattern can be put into the header word, and the intermediate HSNs will set the sub-network accordingly. For a related approach see the distributed routing scheme in the dynamic network proposed by C. Wu, and T. Feng, "On a Class of Multistage Interconnection Network," IEEE Trans. on Computer, August 1980. For an irregular problem with possible collisions, an intelligent path-finding algorithm with congestion avoidance capability is described and claimed herein. The algorithms of this invention can find a shortest path in the shortest amount of time, and each hyperswitch circuit has the intelligent algorithms built into logic routing hardware so as to minimize path setup latency.

Figure 4:
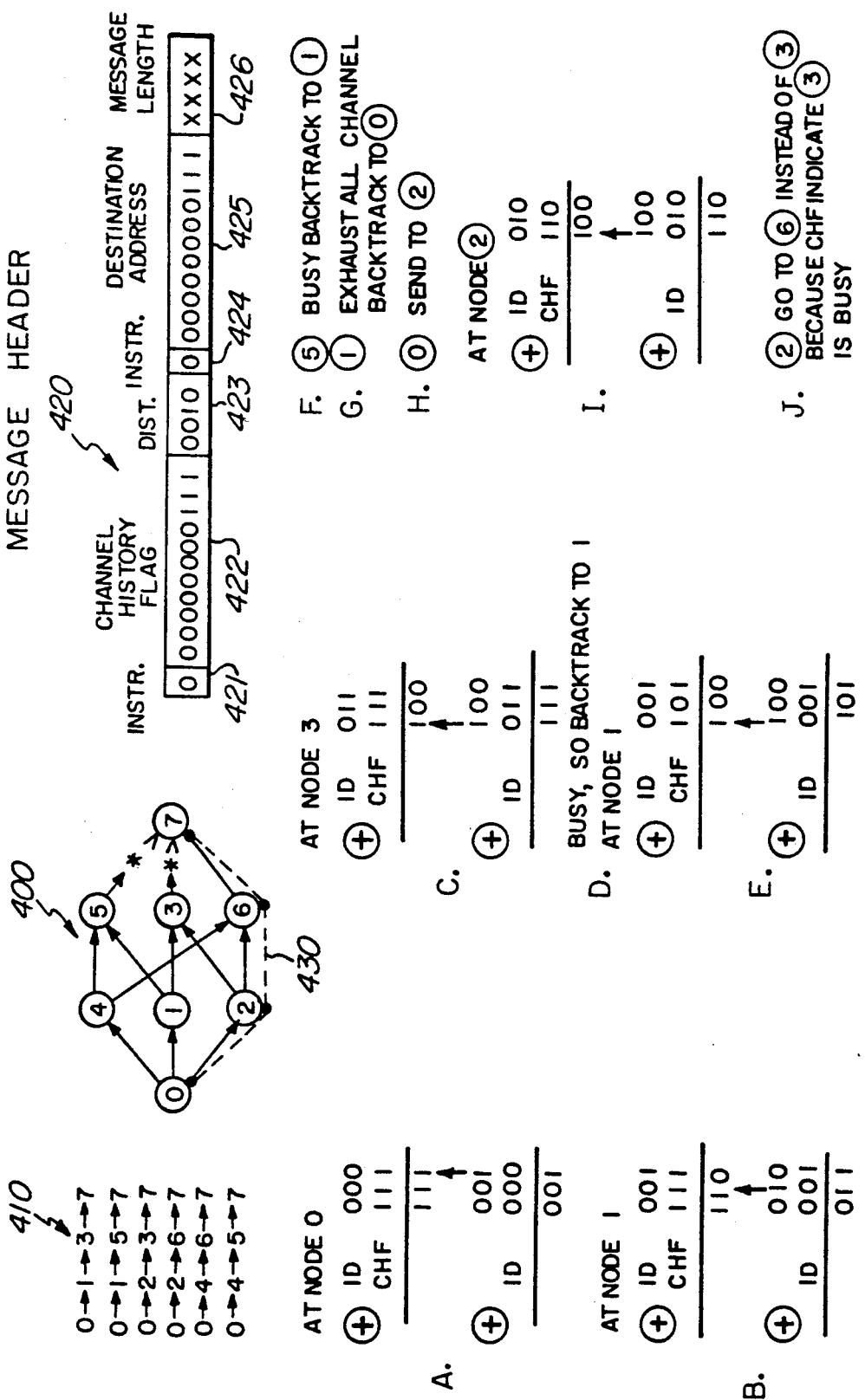
FIG. 4 is a simplified diagram showing adaptive routing and a message header useful in explaining the routing paths in an 8-node hypercube switching system in accordance with this invention.

The routing protocol of this invention involves a header word for each message. A header 420 is shown in FIG. 4 and will be described in more detail hereinafter. Suffice it to say at this point that the header includes channel history, node destination, and distance portions. These portions are used by an intelligent hyperswitch and a routing protocol that is defined as an informed best-first heuristic search algorithm. The destination portion defines the ultimate node's identification for which the message is intended. The distance and history portions of the header allows the hyperswitch processors in the cube-connected network to keep track of the progress of the system as they establish a completed path from an originating to a destination node.

The basic search model is predicated on the following goal:

Goal To reach the destination node using the shortest path in the shortest amount of time (best-first search).

Heuristic Search Procedure:

(i) Only visit virgin areas of the network following a backtracked header status reception. These virgin areas are evaluated by using the channel history flag.

(ii) Perform a channel latch on the first available channel of all terminal channels that terminate in a destination node. This implies that all penultimate nodes in the graph must be attempted for visits.

(iii) If an outbound channel is found blocked, all the successor links are considered blocked for the purpose of the channel history status.

The heuristic search strategy outlined above is an informed search (i.e., uses current dynamic history status to direct the search parameters). This type of search is particularly useful where the number of search states (nodes or search states) grows exponentially with problem size, as is proven hereinafter.

STATEMENT: Let H(n) be a hyperswitch sub-network connected using a hypercube topology that utilizes dynamic routing with backtracking capability for the header during the path setup process. Let there exist a node $x(i)$ and let $C(i)$ be the associated collision factor encountered by a message header such that $x(i)$ is a distance of i from the destination node and that $x(i)$ is forced to return the header to the last forwarding node.

TO PROVE: That there exists a fixed number of virgin paths that may be used by a backtracked header such that it does not encounter the already discovered congested nodes on a message track. This number of virgin paths is a function of i and n where n is number of hops between source and destination.

PROOF:

Node $x(i)$ has i! paths to destination node, where i is the number of hops from $x(i)$ to destination node. Node $x(i+1)$ that precedes node $x(i)$ has $(i+1)!$ paths to destination, where $(i+1)$ is the number of hops from node $x(i+1)$ to destination. When a header backtracks from node $x(i)$ to node $x(i+1)$ it gains $(i+1)-i! = (i)*(i)!$ paths to destination. It is assumed that i is selected such that smallest i satisfies: $(i!) >= (C(i)+1)$, here $C(i)$ is the collision factor at $x(i)$. Number of paths outside the i! paths belonging to $x(i)$ are: (i) (i!)-(i!) (i-1).

Number of virgin paths outside the $i!$ paths belonging to node $x(i)$:
$= \{(i!) (i) - ((i - 1)!) (i - 1) (n - 1))\}$
$= \{(i - 1)! [i*i - (i - 1) (n - 1)]\}$ Number of virgin paths VPATHS$(i + 1)$ available to node $x(i + 1)$ are:
$= \{(i - 1)![i*i - (i - 1)(n - 1)]\}$ − (number of times header returned at $x(i + 1)$)

*QED*

The probability that a path will be successfully formed is based on computing the probability of successfully latching an outbound channel in a series of steps at each intermediate node. Let the process of latching a channel in hop n be denoted by event E(n).

We are interested in the probability that a series of events (E(1), E(2),... E(n)) will occur exactly in that order, thus forming a given path between the source and the destination node. Probability (events E(1), E(2). . . E(n) will occur in that order in n trials at n intermediate nodes)

$= p(n)$
$= p(E(1)) * p(E(2) | E(1)) * \ldots * p(E(n) | E(1)E(2) \ldots E(n - 1))$ where probability p(E(2)/ E(1)) is conditional probability that event E(2) occurs en that event E(1) has occurred. This is essentially true since a header can only try to latch a channel in hop 2 if and only if it has already latched a channel in hop 1. Hence the sequence of occurrence is important in computing the overall probability of success (i.e., E(1) cannot occur before E(2)). Nodes closer to the destination node contribute a progressively decreasing probability of success and hence need to be pruned more exhaustively than earlier nodes (nodes that are closer to the source node). In addition, the effective number of retries for the header at each node is given by:

Expected number of retries at $x(i) = 1/ \text{VPATHS}(i)*p(i)$.

This is the expected number of retries that can be anticipated at node $x(i)$ with a collision factor of $C(i)$.

Using a static routing technique, each message, when originated, is provided with a destination node address that identifies the destination node by its binary identifier. As a message header reaches any node, an exclusive or ("EXOR") of the message header's destination identifier with that node's address identifier will be all 0's only if the message is at its destination node. A binary 1 in any of the dimensional locations of the EXOR result shows the message is not at its destination. In the examples given in Table 1, the apriori path setup includes from top to bottom the lowest numbered paths to the highest numbered paths which must progressively be traversed to reach the destination node. While the number of hops is constant throughout Table 1, the identity of nodes being traversed is progressively increasing. Thus, if one scans Table 1, it will be noted that lines 1 and 2 show the lowest numbers of a collection of progressively increasing nodes which will ultimately reach node 15. The hops in this lowest progressive order are from node 0 to 1 to 3 then through either node 7, or node 11 to node 15. The second most optimal paths are shown at lines 3 and 4, etc. Once the possibilities from node 1 are exhausted, the table shows that the paths from node 0 to node 2 will be explored.

A simplified explanation will be used to explain the optimality of the search algorithms of this invention. Two algorithms will be explained and those algorithms are designated as the k algorithm and the k*(k−1) algorithm. In both of the search algorithms, all nodes traversed along the entire message track are visited exactly once.

Algorithm k Definition

Goal: To latch the first available terminal channel to the destination node using the first accessible penultimate node.

Search Criteria: At most one attempt will be made to reach all given penultimate nodes.

Time Complexity: Order of (k+C1) hops where k=number of channels per node log(N)
C1=number of terminal channels busy Therefore, Algorithm k has a performance on the order of k+k.

Algorithm k*(k−1) Definition

Goal: To latch first available terminal channel to the destination node using the first accessible penultimate node.

Search Criteria: Every possible attempt will be made to reach all the given penultimate nodes.

Time Complexity: Order of (k+C2) hops where k=number of channels per node=log(N)
C2=(number of terminal channels busy)$^2$ Therefore algorithm k*(k−1) has a performance on the order of k+k*k and hence is more exhaustive than Algorithm k.

The table of FIG. 7 shows a comparison of the number of hops required for these algorithms as a function of terminal load (depicted by the number of terminal channels that are busy at the destination node at a given instant).

Starting first with an explanation of the k algorithm, the steps are an orderly sequence which includes:

| Step No. | Action |
| --- | --- |
| 0 | initialize pointers to root or originating node; |
| 1 | start with the root node (i = n − 1); |
| 2 | scan message header node i starting from lowest available channel if $b_i$ = 0 |
| 3 | locate first available channel; lowest available channel = first available channel; adjust pointers; |
| 4 | if (first available channel = unlatched) then latch first available channel and transmit header to node (i − 1); hop = hop + 1; else go to step 2; |
| 5 | If no available channel at node (i) then if (i ≠ n − 1) then backtrack to node (i + 1); history vector [$b_{n-1}$ ... $b_i$ ... $b_0$] = [$0_{n-1}$ ... $0_{n+1}1_i$ ... $1_0$]; hop = hop − 1; no. of tries left at node (i + 1) = (fan-out at node (i + 1)- # of bits = 1 in history vector) = n-hop − i − 1 |
| 6 | If (number of tries left at node (i + 1) > 0) then i = i + 1; go to step 2; else go to step 5. |

Having explained in simple terms the operation of the k algorithm, a representative example will be used in conjunction with the information supplied in Tables No. 1 and 2. Table 2, hereinafter, is a representative example of the above-noted steps wherein it is assumed that the originating node is node number 0 and the destination node is node number 15. The information shown in Table 2 is the same as that of Table 1 and also includes descriptive symbols. For example, a left to right arrow (→) indicates that a path has been established between the adjacent nodes, the symbol of an *> indicates that no path was found, and a right to left arrow (←) indicates a backtrack. An arrow with a slash (↛) indicates that a node other than an ultimate node has been tried once unsuccessfully and thus is not tried again.

TABLE 2

| 1. | 0 | → | 1 | → | 3 | → | 7 | *> | 15 |
| --- | --- | --- | --- | --- | --- | --- | --- | --- | --- |
|  |  |  |  |  |  | ← |  |  |  |
| 2. | 0 | → | 1 | → | 3 | → | 11 | *> | 15 |
|  |  |  |  |  | ← |  | ← |  |  |
| 3. | 0 | → | 1 | → | 5 | → | 7 |  | 15 |
| 4. | 0 | → | 1 | → | 5 | → | 13 | *> | 15 |
|  |  |  |  |  |  | ← |  |  |  |
| 5. | 0 | → | 1 | → | 9 | → | 11 |  | 15 |
| 6. | 0 | → | 1 | → | 9 | → | 13 |  | 15 |
|  |  | ← |  | ← |  |  |  |  |  |
| 7. | 0 | → | 2 | → | 3 | → | 7 |  | 15 |
| 8. | 0 | → | 2 | → | 3 | → | 11 |  | 15 |
| 9. | 0 | → | 2 | → | 6 | → | 7 |  | 15 |
| 10. | 0 | → | 2 | → | 6 | → | 14 | *> | 15 |
|  |  | ← |  | ← |  |  |  |  |  |
| End first trial unsuccessfully | | | | | | | | | |

As shown in Table 2 at line 1 paths were latched from node 0 to 1 to 3 to penultimate node 7. No path from 7 to 15 was available. In accordance with the k alogrithm, a penultimate node such as node 7 is tried once only and it is not again checked during any one trial. The unsuccessful trial at node 7 is noted in the history section of the header and, as shown in line 2, the next available route from 3 to 11 was checked. That route was also found unavailable. Again, the history section is updated to reflect that 11 was an unsuccessful trial. Since no further possibilities from node 3 (other than 7 and 11) are available, the header is backtracked away from 3 to node 1 where the next unexplored lowest-ordered path is checked. In line number 3, the path from node 1 to node 5 is latched but the path from 5 to 7 is not tried because 7, a penultimate mode was not earlier successful when tried. (See line 1).

Assume that the path from node 5 to 13 is not available because all channels at node 13 are busy, the busy condition of node 13 is stored in the header history and penultimate node 13 will not again be tried during this search cycle. At this point the search history reflects the fact that the first four lowestorder trials have been exhausted and that channels at nodes 7, 11 and 13 are eliminated from further trials during this search cycle. Lines 5 and 6 of Table 2 are latched to node 9 but those from 9 to 15 go through nodes 11 and 13 and these are not tried further because nodes 11 and 13 have already been eliminated from the search tree. The search at line 6 is now backtracked to the root node 0. Next, at line 7, a path is established from node 0 to node 2. At node 2 the paths through node 7 or node 11 have already been eliminated so they are not tried. Table 2 shows a successful trial from node 2 to node 6. At node 6 one path to node 15 is through node 7 which is already eliminated. Node 6 also has available to it a path through node 14 and thus that path is checked. Assume that node 6 checks node 14 and a check from 14 to 15 shows that channel 14 is busy. At this point the instant search trial is terminated because all of the penultimate node paths go through eliminated possibilities. Accordingly, the search trial will again restart with the lowest order channel paths as shown by line 1 of Table 2 and repeats in the above-described manner until a successful path has been latched from an origin to the destination node.

The k*(k−1) algorithm is a more exhaustive search than the k algorithm. The following description of the sequence of steps applies to the k*(k−1) algorithm.

| STEP NO. | ACTION |
|---|---|
| 0 | Initialize pointers to root node (node i); |
| 1 | (i = n); initial history vector [b(n) ... b(1)] = [0 ... 0]; hop = 0; for (i = 1; i < = n; i ++) b(i) = 0; chan_step(i) = 1; return_hdrs_fwd(i) = 0; hdr_returned_back(i) = 0; i = n; hop = 0. |
| 2 | While still not at destination node, visit each penultimate node i − 1 times precisely. Start with lower channels and progressively move the header forward to the child specified by chan_step(i). If all channels evaluated by chan_step(i) cannot be latched, move back to the next level parent until a parent is reached where unused channels are found. All nodes traversed along the entire message track are visited exactly once. |
| SUB-STEP | |
| 2.1 | While (i > 0), using dst_node as index and chan_step(i) as offset, evaluate the next out_chan(i) and the immediate child of i that will be targeted for transmission |
| 2.2 | out_chan(i) = child(i, chan_step(i)); next_avail_chan(i) − out_chan(i); if (next_avail_chan(i) == unlatched) latch(next_avail_chan(i)); xmit(hdr,child(i,out_chan(i)); /*xmit to child of node i*/ i = i − 1 |
| 2.3 | else if (next_avail_chan(i) == latched) if (b(i) == 0) switch (chan_step(i)) |
| 2.4 | case '1': chan_step(i) = chan_step(i) + 1; break; |
| 2.5 | case '2' if (i > 2) break; |
| 2.6 | case 'j': if (i > 2) chan_step(i) = 1; break; |
| 2.7 | case '1': while (chan_step(i) == 1 && b(i) == 1) if (i != n) b(i) = 1; xmit_back(hdr,parent(i)); i++; hdr_returned_back(i)++; if (b(i) == 0) if (chan_step(i) < 2 chan_step(i)++; else if (chan_step(i) == 2 && i > 2) chan_step i) = i; |
| 2.8 | else if (b(i) == 1) |

-continued

| | ACTION |
|---|---|
| | if chan_step(i) = i) chan_step(i) = chan_step(i) − 1; else if (chan_step(i) == i − 1 && i >2) chan_step(i) = 1; |
| 2.9 | return_hdrs_fwd(i) = hdr_returned_back (i + 1); hop = hop −1; if (return_hdrs_fwd(i) == 0 && i >= 3) templ = i. |
| 3 | Prune the sub-tree to be visited in future (ahead of time) by looking the no. of times the header was returned at this node in the past. This consideration removes possibilities that otherwise may be revisited. while (i >= 3) if (hdr_returned_back <2) chan_step(i − 1)++; else if (hdr_returned_back == 2) chan_step(i − 1) = i − 1; i = i − 1; i = templ; |
| 4 | If the header returned back was already a returned header (reflected by a positive value for the field return_hdrs_fwd at node i), then some further pruning ahead of visiting future nodes is necessary. else if (return_hdrs_fwd(i) > 0 && i >= 3) temp2 = i while (i >= 3) chan_step(i − 1) = 2; i = i − 1; i = temp2. |

Table 3 uses the symbology of Table 2 and explains a representative example of this second algorithm, k*(k−1), for a message header from node 0 to node 15.

TABLE #3

| 0 | → | 1 | → | 3 | → | 7 | *> | 15 |
|---|---|---|---|---|---|---|---|---|
|   |   |   |   |   | ← |   |   |   |
| 0 |   | 1 |   | 3 | → | 11 | *> | 15 |
|   |   |   | ← |   | ← |   |   |   |
| 0 |   | 1 | → | 5 | → | 13 | *> | 15 |
|   |   |   |   |   | ← |   |   |   |
| 0 |   | 1 | → | 5 | → | 7 | *> | 15 |
|   |   |   |   |   | ← |   |   |   |
| 0 |   | 1 | → | 9 | → | 13 | *> | 15 |
|   |   |   |   |   | ← |   |   |   |
| 0 |   | 1 | → | 9 | → | 11 | *> | 15 |
|   | ← |   | ← |   |   |   |   |   |
| 0 | → | 2 | → | 10 | → | 14 | *> | 15 |
|   |   |   |   |   | ← |   |   |   |
| 0 |   | 2 |   | 10 | → | 11 | *> | 15 |
|   |   |   | ← |   |   |   |   |   |
| 0 |   | 2 | → | 6 | → | 14 | *> | 15 |
|   |   |   |   |   | ← |   |   |   |
| 0 |   | 2 | → | 6 | → | 7 | *> | 15 |
|   | ← |   | ← |   | ← |   |   |   |
| 0 | → | 8 | → | 12 | → | 14 | > | 15 |
|   |   |   |   |   | ← |   |   |   |
| 0 |   | 8 |   | 12 | → | 13 | *> | 15 |
|   | → |   | → |   | → |   |   |   |

End first trial unsuccessfully

In Table 3 second trials at nodes 7, 11, 13 and 14 were made. This approach differs from the k algorithm of Table 2 because in the k algorithm a penultimate node is tried one time only. In the k*(k−1) algorithm a penultimate node is tried k−1 times.

Referring to FIG. 1, note that a completed path from node 3 through node 11 to node 15, for example, requires that node 11 establish a connection within itself between one incoming channel (from node 3) to an outgoing channel (node 11 to node 15). At node 11, other processes may be on-going which may have caused the outbound channel from node 11 to node 15 to be busy. Examples of such activity at node 11, include node 11's formulation of a header to be routed to node 15, or node 11 may actually be sending data to node 15. In accordance with this invention, the hyperswitch processor at node 11 checks the outbound channel, and finding it busy automatically reroutes the header without interrupting or communicating with the node processor at node 11. Although it has been called backtracking, it will be shown that the header is not physically backtracked. Instead a copy of the header is left at node 3, and status signals are used to indicate that a busy condition exists at node 11. Those status signals are applied back to node 3 by node 11's processor. At node 3 the header's channel history flag is automatically up-dated in response to those status signals. This backtracking technique reduces message latency.

Figure 3:
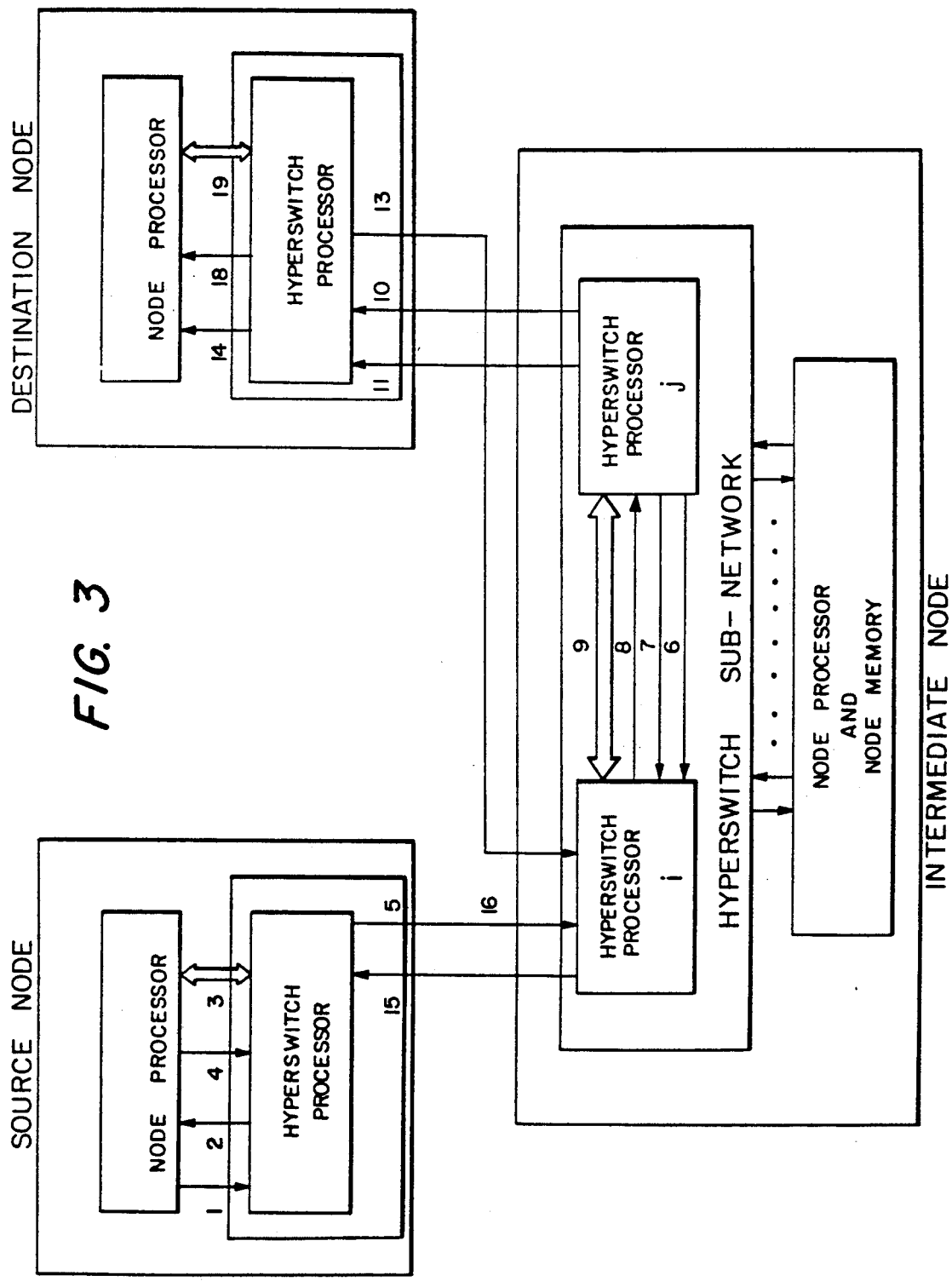
FIG. 3 is a simplified sketch depicting the steps involved in establishing a completed path from an originating node though an intermediate node and to a destination node in accordance with this invention.

FIG. 3 depicts a simplified example of the steps involved in transmitting from a source node through an intermediate node 175's HSN to a destination node 180. The steps involved are set forth by an orderly sequence given by the numbers in parenthesis in Table 4 below. Opposite the step is a brief and mostly self explanatory description.

TABLE #4

The orderly sequence involves the following
1. Source Node Processor ("SNP") request its own hyperswitch processor ("HSP").
2. HSP acknowledges SNP.
3. SNP dumps data, preceded by a header, into HSP buffer memory.
(4) After SNP sets DUMP signal to low, HSP takes the bits making up the header from the buffer memory and sends the header out.
(5). Intermediate node HSP ("IN HSP") receives header.
(6). IN HSP requests an outbound channel from within the intermediate node's HSP units.
(7). IN HSP gets an acknowledge signal from within itself.
(8). Intermediate node HSP requests high speed bus and gets priority.
(9). Intermediate node HSP sends header to outbound channel HSP.
(10). Outbound channel HSP sends header out.
(11). Outbound channel HSP sets channel interface crossbar switch.
(12). Destination node HSP receives header.
(13). Destination HSP sets "enable to send" status.
(14). Destination HSP interrupts destination node processor.
(15). Source node HSP gets "enable to send" status.
(16) Source node HSP starts to send data.
(17). Destination node HSP receives data.
(18). Destination node HSP sets request line high after its buffer is full.
(19). Destination node takes data from HSP to destination node's memory.

FIG. 4 depicts a simplified 8-node network 400. Legend 410 shows the routes that are possible from an originating node, node 0, to a destination node, node 7. An originating node formats a message header 420. The header 420 includes a serial stream of bits, which include as a typical example, an instruction bit 421 at bit position number 0, a channel history field 422 at bit positions 1 through 11, a distance field 423 at bit positions 12-15, another instruction bit 424 at position 16, a destination field 425 at bit positions 17-27 and a message length field 426 at the remainder of the header's bit positions. The hyperswitch routing logic implementation can be adapted to the k or k*(k−1) algorithmic definitions by simply changing the "distance" field in the header. For defining algorithm k, the distance field is set as the number of hops minus 1. For defining algorithm k*(k−1), the distance field is set as the number of hops minus 2. Quite obviously timing, framing parity and other information may be formatted into the serial bit stream of header 420.

A series of steps are depicted in FIG. 4 and these steps show in a simplified way how EXOR operations automatically reroute a header 420 until it reaches its destination at node. The vertical arrows in FIG. 4 symbolically depict routing and channel history flag changes which will be clarified by a description hereinafter in connection with an explanation of the routing logic of FIG. 6.

Figure 5:
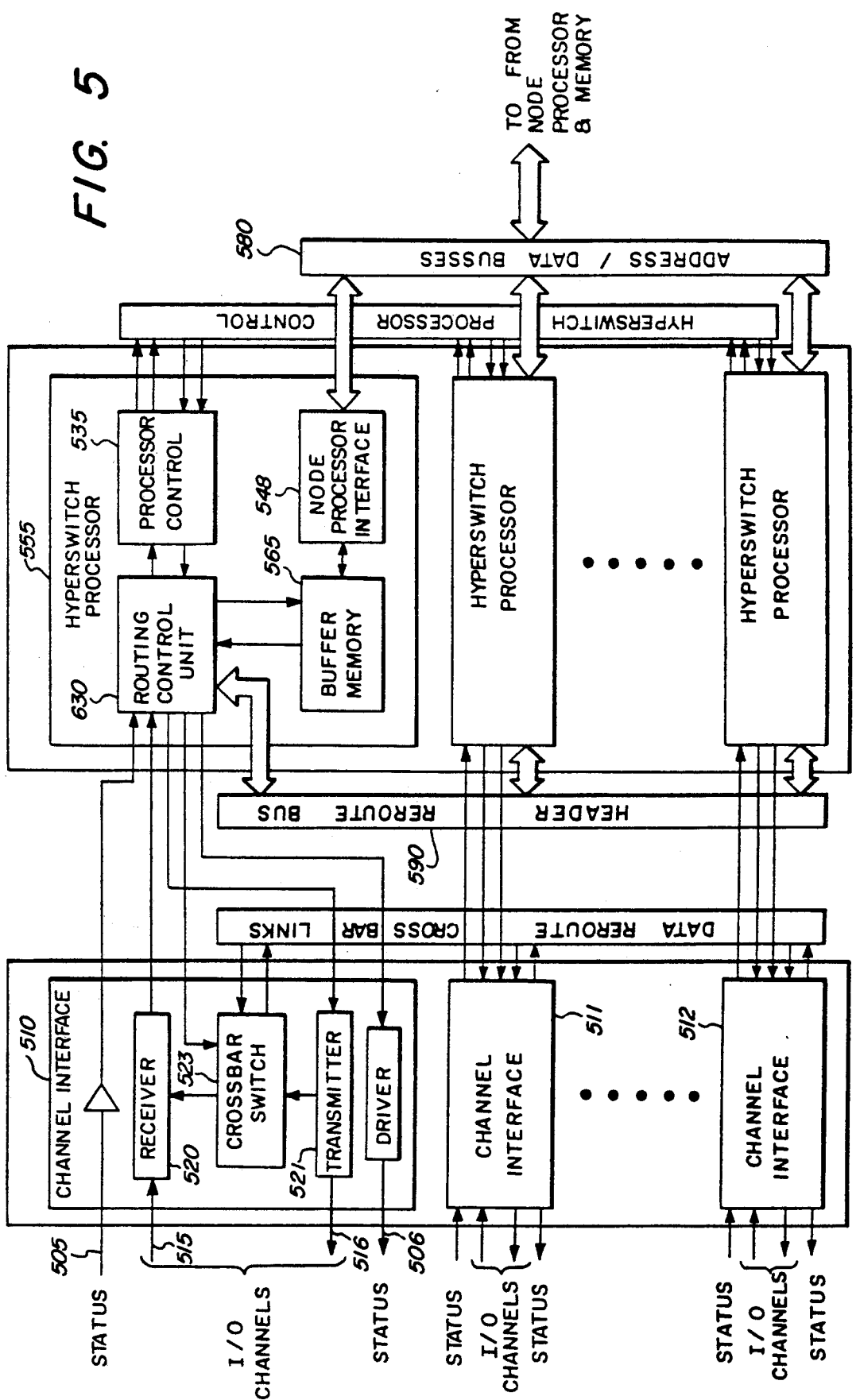
FIG. 5 is a more detailed block diagram of a plurality of hyperswitch sub-networks at a node.

FIG. 5 depicts a block diagram of the switching circuit system of this invention capable of accommodating any given number of dimensions for a cube-connected network. Two status bits are present on leads 505 and 506. Those status leads are into and out of each one of channel interface and cross bar switch units 510, 511 and 512. Leads 515 and 516, into and out of unit 510, represent pipelining data lines.

Within the unit 510, and connected to leads 515, 516 are receiver and transmitter units 520, 521. Receiver 520 translates an incoming serial bit stream into parallel bytes. For example, receiver 520 may translate incoming data into bytes of eight bits each, and four bytes are collected in parallel as a header in routing control unit 630. Processor control unit 535 controls the routing control unit 630 and also controls the node processor interface circuitry 548. Buffer memory 565 in hyperswitch processor 555 receives parallel words of thirty two bits each.

Assume that a header has been received over an incoming line 615, and the header is stored and interpreted as such by routing control unit 645. The routing control unit 645 will either determine from the header that it is at its destination, or that it must be rerouted. If the header is at its destination node the data lines are connected through buffer memory 675, channel interface 548, and communication bus 580 into the destination node's memory. If the header is not at its destination, then the header is rerouted over a header reroute bus 590 and through one of the other channel interface units 511 or 512. Routing control 630 closes a crossbar switch, such as switch 523, and the header goes back out over an appropriate cross bar link 582.

Figure 6:
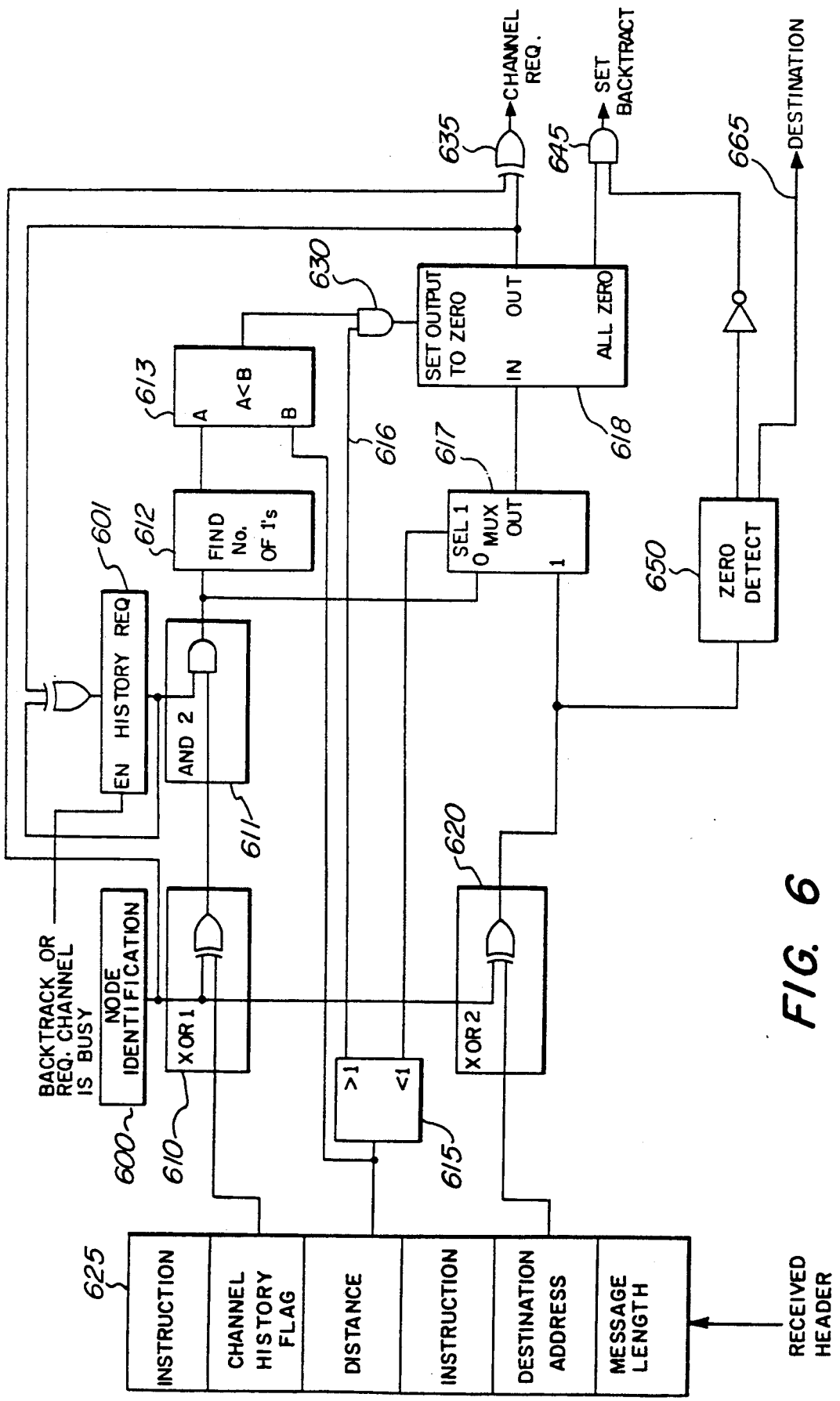
FIG. 6 is a block diagram of a hyperswitch processor's routing control unit in accordance with this invention.

FIG. 6 includes hardware implementation logic. The logic legends correspond to the routing algorithm implementation which is described in a high-level code, as follows:

| INITIAL CONDITIONS: |
| --- |

SET FIELDS IN header:
SET CHF = destination_address;
SET DIST = #_of_hop − 1 /* for k algorithm */;
_of_hop − 2 /* for k*(k − 1) algorithm */;
SET DEST = destination_address;
SET MLEN = #_of_256_bytes_packets;
ROUTING LOGIC:
/* initialize data*/

-continued

INITIAL CONDITIONS:

```
/* mask register is not shown, it is always 'AND' with
the xor1_out and xor2_out */
RECEIVE header:
state_register = 0;
xor1_out = CHF XOR current_node_ID;
and2_out = xor1_out AND (INV state_register);
/* destination is next node */
IF DIST EQUAL TO 0 THEN
 xor2_out = DEST XOR current_node_ID;
 IF XOR2_OUT NOT EQUAL TO 0, THEN XOR2 - OUT
channel_number =
SELECT_FIRST_ONE_FROM_LSB_TO_MSB (xor2_out);
IF (REQUEST (channel_number, state_register)) THEN
TRANSMIT_HEADER_TO (channel_number);
EXIT_ALGORITHM:
END_IF;
END_IF;
SET_BACKTRACK_STATUS;
END IF:
/* destination is two hops away */
IF DIST EQUAL TO 1 THEN
WHILE (and2_out NOT EQUAL TO 0) DO
channel_number =
SELECT_FIRST_ONE_FROM_LSB_TO_MSB (and2_out);
IF (REQUEST (channel_number, state_register)) THEN
TRANSMIT_HEADER_TO (channel_number);
EXIT_ALGORITHM:
END IF:
xor1_out = CHF XOR current_node_ID;
and2_out - xor1_out AND (INV state_register);
END_WHILE;
SET_BACKTRACK_STATUS;
END IF:
/* regular routing algorithm*/
IF DIST GREATER THAN 1 THEN
#_of_ones = CALCULATE_NUMBER_OF_ONES
(and2_out);
WHILE ((and2_out NOT EQUAL TO 0) AND
(#_of_one GREATER THAN OR EQUAL TO DIST)) DO
channel_number_ =
SELECT_FIRST_ONE_FROM_LSB_TO_MSB (and2_out);
IF (REQUEST (channel_number, state_register)) THEN
TRANSMIT_HEADER_TO (channel_number);
EXIT_ALGORITHM;
END_IF;
xor1_out = CHF XOR current_node_ID;
and2_out = xor1_out AND (INV state_register);
#_of_one = CALCULATE_NUMBER_OF_ONES
(and2_out);
END_WHILE;
SET_BACKTRACK_STATUS;
END_IF;
END_OF_ENCODED_ROUTING_LOGIC.
```

The routing logic circuit 630 which implements the above is depicted in FIG. 6, the operation of which will now be described. Outputs from the routing circuit 630 of FIG. 6 determine whether or not a header received in a header storage device 625, is to be moved forward, is to be backtracked, or is at its destination. A move forward command for the header will appear as an output signal from gate 635. A backtrack signal appears as an output signal from gate 645, and a destination output is presented on lead 665.

Obviously each node knows its own unique identity and that node's identity is stored in an identity register 600, FIG. 6. The node's identity is applied as one term to an Exclusive-OR function shown simply as an EXOR gate 610, FIG. 6. The other input term to the EXOR gate 610 is the channel history field from a received header that is placed into the header storage device 625. The node's identity is also applied as an input term to a second Exclusive-OR function shown as gate 620.

As an example, assume that node 0 originated a header and transmitted it to node 1 pursuant to the applicable procedure discussed hereinbefore and in connection with FIG. 3. (See step A of FIG. 4). Node 1's identity is 001 and step B of FIG. 4 is applicable. At the identity register 600, in node 1, is an identity signal "001" for node 1. The destination node is "111" or node 7. EXOR gate 610 receives these two input terms and the summation is "110" which appears on the input lead to gate 611.

The distance as shown by legend 410, FIG. 4, is a total of three hops so the distance field is set to one less than three or two, which is "010". Distance field decoding circuit 615 enables the greater-than-one lead 616 which applies a true condition to AND gate 630.

History register 601 is initialized to an all "1" condition and its output is "111". Gate 611 applies its output "110" to circuit 612. Circuit 612 may be any well known circuit which functions to count the number of ones supplied from gate 612. The answer of two is applied to the A term of a difference circuit 613. The B term to difference circuit 613 is the distance field, or 2. Since 2 is not less than 2, circuit 613 applies another true condition to gate 630, and in response thereto an output lead from a ones-select circuit 618 is cleared to reflect the condition of an input signal selected by multiplexer 617.

Multiplexer 617 applies the output from gate 611 as an input term to circuit 618. Circuit 618 selects the first 1 from the right. The first one from the right, as shown by step B in FIG. 4, is reflected as a term "010". Gate 635 has two input terms, the node's identity "001" and the output from select circuit 618. The logic operation of gate 635 designates "011", or node 3, as the next channel select. The processor at node 1 responds by moving the header to node 3 and reserving the circuit section between node 1 and node 3. The status lines are used to make that selection as was described earlier.

At node 3 the procedure of logic routing circuit 630, FIG. 6, is repeated by an identical logic routing circuit at node 3. The header next tries to go to node 7, its destination, as shown by step C in FIG. 4. A busy channel from node 3 to node 7 is present, step D in FIG. 4, and the header does not wait at node 3. Instead a status line from node 3 back to node 1 sets the channel history flag in the copy of the header left in register 625 at node 1 to reflect this busy condition and to inform node 1 that the header must either be forwarded on another outgoing channel from node 1, or it must be back-tracked to node 0. The channel busy status signal from node 3 to node 1 appears as a signal on lead 602 at register 601. That input signal alters the history state register and the history portion of the header at node 1. The status history register 601 is now changed to read 101. The channel history portion previously contained all 1's, and the middle 1 was responsible for getting the header to "busy" node 3, so that middle 1 is changed to a zero. At node 1, the operation reflected at step D in FIG. 4 occurs and the header is now routed to node 5.

At node 5 the header is again supposed to be routed to node 7 but again encounters a busy channel. All of node 1's outgoing channels are now exhausted so the header's history portion at node 0 must be updated to reflect that nodes 1, 3 and 5 have been pruned or eliminated from any further consideration for this one selection attempt. The logic routing circuit 630 does not select the route from node 0 to node 4 at this time, as a check of the operation reveals that the channel selected is for node 2. The channel history "110" is passed to node 2 where it is again EXORed by that node's routing control circuit 630, and the described operation repeats. At node 2 the pruned, or eliminated status of node 3 causes the header to be routed to node 6 rather than node 3. As shown by legend 400, a path from node 6 to node 7 is available and thus the header reaches its destination at node 7.

At node 7, that node's routing control circuit 630, via zero detect circuit 650, recognizes that the header has reached a destination node. An output from the destination correct lead 665 is sent back through the status lines from node 7, to node 6. The status lines indicate "01" at this time as an indication that the destination node is ready to receive data. A completed pipeline data path has now been latched because the sections from node 0 to 2 and from 2 to 6 were held as the header progressed through those node's HSNs. Data transmission, as described from node 0 to node 7 can now occur over a high speed data line 430. The data line 430 is symbolically shown in FIG. 4 as a dashed line passing through dots on nodes 2 and 6 to indicate that it is a virtual link that needs no interaction with the node processors at nodes 2 and 6 nor does it require any further reaction with the hyperswitch processors at those nodes.

The above description present the best mode contemplated in carrying out our invention. Our invention is, however, susceptible to modifications and alternate constructions from the embodiments shown in the drawings and described above. Consequently, it is not the intention to limit the invention to the particular embodiments disclosed. On the contrary, the invention is intended and shall cover all modifications, sizes and alternate constructions falling within the spirit and scope of the invention, as expressed in the appended claims when read in light of the description and drawings.

What is claimed is:

1. A method of searching for a best-first path from an originating computer ("node") through any number of intermediate node(s) to a destination node, when said nodes are connected in a cube-configured network having a plurality of path sections interconnecting the originating, intermediate and destination nodes, comprising the steps of:
    trying individual path sections of the network in a preferred order of paths which lead from the originating to the destination node;
    eliminating from the order of paths to be tried, those path sections terminating at a destination node and found busy; and
    latching the first non-busy terminal path section of the preferred order which completes a path from the originating to said destination node.

2. A method in accordance with claim 1 wherein the eliminating step further comprises the step of:
    considering as eliminated from further tries all path sections located between the originating node and the node where the busy path section is found.

3. A method in accordance with claim 1 and further comprising the additional step of:
    reserving as a partially completed path, each successfully tried path section in any given one of said preferred order, until said first non-busy terminal path is latched to fully complete said path.

4. A method in accordance with claim 1 and further comprising:
    storing information at the busy nodes reached during any given try to eliminate any retry of such node(s) during any one complete search cycle through said network.

5. A method in accordance with claim 1 wherein said trying step comprises:
    originating a message header at said originating node; and
    forwarding said header over the paths in said preferred order.

6. A method in accordance with claim 5 and further comprising:
    embedding, in said header, information reflecting path sections which have been eliminated from any further tries.

7. A method in accordance with claim 6 and further comprising:
    embedding, in said header, routing information which controls the path sections over which the header is routed.

8. A method in accordance with claim 1 and further comprising:
    establishing a system-wide routing alogrithm at every node; and
    performing said steps of trying, eliminating, and latching in accordance with said routing algorithm.

9. A method in accordance with claim 8 and further comprising:
    dynamically changing the order of paths to be tried during any one search cycle based upon the busy and non-busy conditions of path sections tried during said search cycle.

10. A method in accordance with claim 1 wherein the destination node in said network is connected to a plurality of penultimate nodes, and wherein said trying step further comprises:
    searching for a complete path using a search criteria where at most one attempt will be made to reach all given penultimate nodes.

11. A method in accordance with claim 1 wherein the destination node in said network is connected to a plurality of penultimate nodes and wherein said trying step further comprises:
    searching for a complete path using a search criteria where every possible attempt will be made to reach all of the penultimate nodes.

12. A method in accordance with claim 10 wherein an intermediate node comprises a plurality of input lines and at least an equal number of output lines and comprising the further steps of:
    searching for a non-busy path at every one of the output lines from said intermediate node.

13. A method in accordance with claim 12 and further comprising:
    sending over the input line that requested a search of the output lines, a signal indicative of a busy condition at all of said output lines at said intermediate node.

14. A method in accordance with claim 11 wherein an intermediate node comprises a plurality of input lines and at least an equal number of output lines and comprising the further steps of:
    searching for a non-busy path at every one of the output lines from said intermediate node.

15. A method in accordance with claim 14 and further comprising:
    sending over the input line that requested a search of the output lines, a signal indicative of a busy condition at all of said output lines at said intermediate node.

16. A method in accordance with claim 8 and further comprising:
   implementing the routing algorithm in logic circuitry; and
   providing identical logic circuitry at every node.

17. A method in accordance with claim 16 wherein said trying step further comprises:
   originating a message header at said originating node; and
   forwarding said header over the paths in said preferred order.

18. A method in accordance with claim 17 and further comprising;
   embedding, in said header, information reflecting path sections which have been eliminated from any further tries.

19. A method in accordance with claim 18 and further comprising:
   embedding, in said header, routing information which controls the path sections over which the header is routed.

20. A method in accordance with claim 17 and further comprising:
   establishing a system-wide routing algorithm at every node; and
   performing said steps of trying, eliminating, and latching in accordance with said routing algorithm.

21. A circuit switching system for completing a plurality of data-handling sections of a communication link between connected in a cube-configured network, with any node being capable of originating a message header having embedded therein an identifier of a destination node so that data may be sent from said originating to said destination node after a connected communication link has been completed therebetween, said system comprising:
   means at every node receiving said header for completing, a best-first section of said communication link, if available, between an originating, intermediate and destination nodes, or if said best-first output sections at any node(s) receiving said header are busy, delivering a congestion signal to the last successful forwardly node: and
   means at every node including the last successful forwarding node responsive to said congestion signal for automatically rerouting said header along other sections of the communication link in said cube-configured network until a completed high speed data communication link is established between the originating and destination nodes.

22. A circuit switching system having a best-first message routing algorithm for a plurality of cube-connected nodes, said system comprising:
   means at any node for originating a message having embedded therein a destination node identifier and a channel history flag reflecting the message's progress through the network as it moves toward said destination node;
   means at every node for executing said best-first routing algorithm in accordance with the channel history flag of a message arriving at any given node to seek the best-first route for said message through said network; and
   means at each node transversed by said message for latching a completed circuit through said cube-connected network in accordance with an executed channel history portion of said message routing algorithm.

23. A circuit switching system in accordance with claim 22 and further comprising:
   means at every node receiving a message to be routed for checking the availability or busy status of outgoing channels from the receiving node; and
   means at said receiving node responsive to said checking means for altering said channel history flag of said message in order to reflect the status as checked by said status checking means 24. A circuit switching system in accordance with claim 23 and further comprising:
   means at said receiving node for determining from said channel history flag of said message, the routing for said message along one of a plurality of outgoing channels from said node; and further wherein
   said status checking means is responsive to said determining means for checking the status of said one outgoing channel.

25. A circuit switching system in accordance with claim 23 wherein said receiving node is positionally located between said originating and said destination node, and further wherein:
   said routing algorithm presumes that all network connections between said intermediate node and said destination node are blocked if all outgoing channels from said intermediate node are blocked.

26. A circuit switching system in accordance with claim 25 and further comprising:
   means assigning a unique numerical node identifier to every node in said cube-connected network; and
   said best-first routing algorithm routes each given message through the nodes, if available, which results in the lowest accumulated total of the numerical identifiers for said nodes.

27. A circuit switching system in accordance with claim 26 and wherein in said system is further characterized by:
   said best-first routing algorithm routes each given message through the nodes having said lowest accumulated total of said numerical identifiers and if said nodes are not available through the next lowest accumulated total.

28. A circuit switching system in accordance with claim 22 and further characterized as:
   each message-receiving node having means available thereat for ascertaining for said message: a current node identifier ("ID"), the number of hops ("H") in the cube-connected network between the current node and the destination node ("D"), and the originating, or source, node identifier; and where the number of hops (H) are the number of possibilities for linking together circuit sections for a desired communication link, and a hop is a movement from one node to another.

29. A circuit switching system in accordance with claim 28 and further comprising:
   a routing logic at every node in said cube-connected network for routing said messages in accordance with said routing algorithm.

30. A circuit switching system in accordance with claim 29 wherein said node identifiers are accumulated to form a sum for each of several available paths between the originating and the destination nodes, and wherein said system further comprises:
   means at every intermediate node, i, for locating the lowest available channel (based upon said node identifier values) equal to the first available channel, where the term i designates a node that is i hops away from the destination node.

31. A circuit switching system in accordance with claim 30 wherein a completed path requires hops from node to node and wherein said system is characterized by further comprising:
   means at node, i, which is a node i hops away from a destination node, for performing the following steps:
   (a) if first available channel is not busy then latch said first available channel;
   (b) transmit header to node i−1; and
   (c) change hop to hop+1.

32. A circuit switching system in accordance with claim 30 and further comprising:
   means at node i for performing the additional steps of:
   (a) if first available channel is busy then at node (i) where (i) is less than or equal to (n−1);
   (b) backtrack header to node i+1, where backtrack means to start the steps from the node that forwarded the header to node i;
   (c) set channel history flag $(b_{n-1}, \ldots b_i \ldots b_0) = (O_{n-1} \ldots O_{i+1} \ldots 1_i \ldots 1_0)$;
   (d) set hop to equal hop−1; and
   (e) try a number of alternate channels at node (i+1) = (fan out at node (i+1) − number of bits equaling one in channel history flag equal to n-hop-i−1).

33. A circuit switching system in accordance with claim 32 and further comprising:
   means at node i+1 for determining if the number of possible channels at node i+1 is greater than zero, then i is equal to i+1; and then perform the locating step identified in claim 30; otherwise perform the steps identified in claim 32.

34. A circuit switching system for a plurality of cube-connected computers nodes, said system comprising:
   a search tree for a cube-connected network of a 2n hypercube having nodes located at branching factors formed by communication lines, wherein the number of branches is variable, with a branching, or fan-out, factor of (N) in the first hop, (N−1) in the second hop, (N−2) in the penultimate hop, and 1 in the last hop;
   a search tree algorithm means at each node for locating a completed path through said search tree from an originating to a destination node; and
   means at each node responsive to execution of said search tree algorithm for latching a completed path through said search tree.

35. A circuit switching system for a cube-connected network of a plurality of concurrently-operable computers nodes, said switching system comprising:
   means at an originating node for formulating a message format including a message destination portion and a circuit tranversing history portion in the message format;
   means at said originating node for applying said message to said cube-connected network in accordance with a predetermined routing algorithm;
   means at every node in said cube-connected network for executing said routing algorithm when said message arrives at any individual node; and
   means at each node involved in the execution of said routing algorithm for storing that node's participation of the execution of the routing algorithm in accordance with the message's history portion.

36. A searching system for locating a best-first path from an originating computer ("node") through any number of intermediate node(s) to a destination node, when said nodes are connected in a cube-configured network having a plurality of path sections interconnecting an originating, intermediate and destination nodes, comprising:
   means for checking, in a preferred order, the status of individual path sections of the network which lead from the originating to the destination node;
   means for eliminating from the order of paths to be checked, those path sections which terminate at a destination node and which are found busy; and
   means for latching the first non-busy terminal path section of the preferred order which completes a path from the originating to said destination node.

37. A search system in accordance with claim 36 wherein the eliminating means further comprising:
   means for considering as busy all path sections located between the originating node and the node where a busy path section is found.

38. A searching system in accordance with claim 36 and further comprising:
   means for reserving as a partially completed path, each successfully tried non-busy path section in any given one of said preferred order, until said latching means latches the first non-busy terminal path to fully complete said path.

39. A searching system method in accordance with claim 26 and further comprising:
   means for storing information at the busy nodes reached during any given status check, which information eliminates any retry of such node(s) during any one complete search cycle.

40. A searching system in accordance with claim 36 wherein said status checking means further comprises:
   means at said originating node for originating a message header; and
   means for forwarding said header over the paths in said preferred order.

41. A searching system in accordance with claim 40 and further comprising:
   means for embedding, in said header, information which diverts the header away from path sections which have a busy status.

42. A searching system in accordance with claim 40 and further comprising:
   means for embedding, in said header, routing information which controls the path sections over which the header is routed.

43. A searching system in accordance with claim 36 and further comprising:
   means for establishing a system-wide routing algorithm at every node; and further wherein said eliminating and latching means are controlled by said routing algorithm.

44. A searching system in accordance with claim 43 wherein said algorithm establishing means further comprises:
   means for dynamically changing the order of paths to be checked during any one search cycle based upon the busy and non-busy status of path sections actually checked during one search cycle.

45. A searching system in accordance with claim 36 wherein the destination node in said network is connected to a plurality of penultimate nodes, and wherein said status checking means further comprises:

means responsive to a search criteria where one status check only is made at every given penultimate node.

46. A searching system in accordance with claim 36 wherein the destination node in said network is connected to a plurality of penultimate nodes and wherein said status checking means further comprises:
   means responsive to a search criteria where every possible path configuration leading to all of the penultimate nodes is attempted.

47. A searching system in accordance with claim 45 wherein an intermediate node comprises a plurality of input lines and at least an equal number of output lines and comprising:
   means for searching for a non-busy path at every one of the output lines from said intermediate node.

48. A searching system in accordance with claim 47 and further comprising:
   means for sending back to the last forwarding node a signal indicative of a busy condition at all of said output lines at said intermediate node.

49. A searching system in accordance with claim 46 wherein an intermediate node comprises a plurality of input lines and at least an equal number of output lines and comprising:
   means for searching for a non-busy path at every one of the output lines from said intermediate node.

50. A searching system in accordance with claim 49 and further comprising:
   means for sending back to the last forwarding node a signal indicative of a busy condition at all of said output lines at said intermediate node.

51. A searching system in accordance with claim 43 and further comprising at every node:
   for logic circuitry implementing the routing algorithm.

* * * * *